April 22, 1969     S. WALLIN     3,439,406

METHOD OF SEALING GUIDE JOINTS

Filed Dec. 12, 1966

INVENTOR:
SVEN WALLIN
BY Howson & Howson
ATTYS.

United States Patent Office 3,439,406
Patented Apr. 22, 1969

3,439,406
METHOD OF SEALING GUIDE JOINTS
Sven Wallin, Taby, Sweden, assignor to Aktiebolaget
Svenska Flaktfabriken, Stockholm, Sweden
Filed Dec. 12, 1966, Ser. No. 601,035
Claims priority, application Sweden, Dec. 14, 1965,
16,205/65
Int. Cl. B23p *11/02;* F16j *15/00*
U.S. Cl. 29—450       2 Claims

ABSTRACT OF THE DISCLOSURE

For joining surface elements, a guide rail is provided with a sealing element which comprises a foam plastic strip easily compressible to a substantial degree and impregnated with an asphalt preparation or the like to make it slowly re-expansible which strip immediately prior to the joining of the surface elements is flattened by being pressed against the back of the guide rail whereafter the guide rail is assembled to the elements before the foam plastic starts to re-expand and to return to its original shape, and thereby sealingly to fill the space between said surface elements and the guide rail.

---

The present invention relates to a method of sealing guide joints between two thin-walled surface elements of sheet metal, plastics or like material connected with one another by a guide rail.

Guide joints of the aforesaid type are utilized in many cases for the manufacture of ventilation ducts. In view of the higher sealing requirements it is necessary to provide the guide joint with a sealing strip inserted in the guide rail. It has provide to be difficult, however, to push on the guide rail without at the same time to deform or entirely destroy the sealing strip. The invention which has as its object by simple means to eliminate the said shortcoming, is characterized in that the guide rail is provided with a sealing which comprises a foam plastic strip impregnated with an asphalt preparation or the like and adapted to be compressed to a substantial degree, which strip immediately prior to the joining of the surface elements is flattened by being pressed against the back of the guide rail by means of a tool provided for example with a roller whereafter the guide rail is applied before the foam plastic is allowed to expand and to re-assume its original shape, and thereby sealingly to fill the space between said surface elements and the guide rail.

A guide rail adapted for use in carrying out the method is characterized in that the back of the guide rail is provided with a groove for receiving the said foam plastic strip.

The invention will now be described in a greater detail in the following, with reference to the accompanying drawing wherein FIG. 1 shows the pressing of a foam plastic strip into a guide rail.

Figure 1:
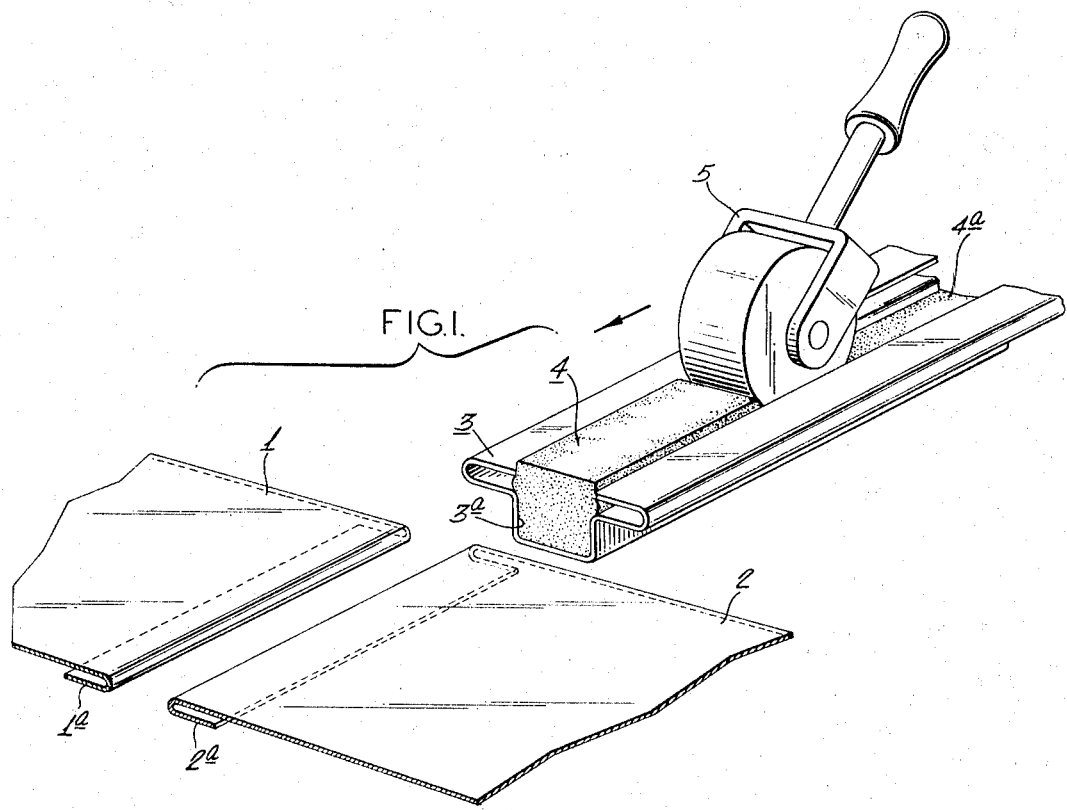
Figure 2:
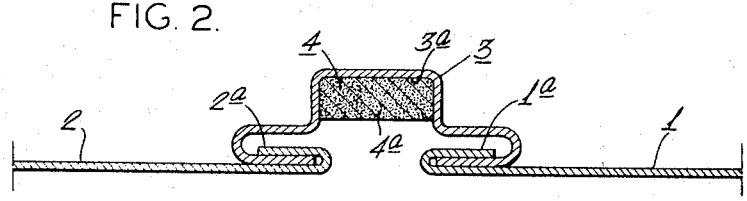
FIG. 2 shows a cross-section of a joint just completed.
Figure 3:
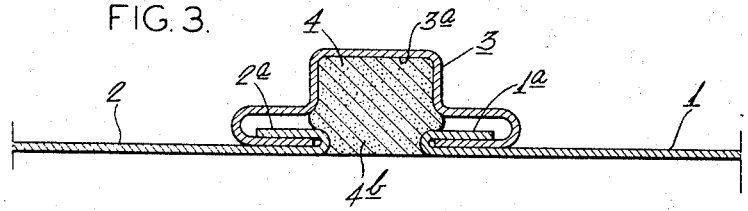
FIG. 3 shows a cross-section of the same joint subsequent to the expanding of the foam plastic strip in the space between the surface elements and the guide rail.

Referring to the drawings, 1 and 2 are two thin-walled surface elements with folded edges 1a and 2a. 3 designates a guide rail for connecting said surface elements. In the embodiment shown the rail is provided with a groove 3a adapted to receive a foam plastic strip 4. 5 is a tool for pressing down the foam plastic strip into the guide rail and for its pressing against the groove of the guide rail, whereby the foam plastic strip assumes the shape 4a shown in FIG. 2. In FIG. 3 is illustrated how the foam plastic strip assumes the shape marked with 4b, whereby the foam plastic strip sealingly fills the space between the said surface elements 1 and 2 and the guide rail 3.

The design of the guide rail as well as the tool applied can be modified in different ways without departing from the inventive idea.

I claim:
1. A method of sealing joints between two thin-walled surface elements having adjacent edge portions folded in opposite directions of sheet material connected by a guide rail having longitudinal edges folded toward each other, characterized by providing between the folded edges of the guide rail a sealing which comprises a foam plastic strip impregnated with an asphalt preparation or the like and adapted to be compressed to a substantial degree, pressing said strip against the portion of the guide rail between the folded edges thereof to flatten and compress said strip immediately prior to the joining of said guide rail with said elements, sliding said guide rail folded edges over the folded edges of said surface elements before the foam plastic is allowed to expand and to re-assume its original shape, and thereafter allowing said foam plastic strip to expand toward its original shape to sealingly fill the space between the said surface elements and the guide rail.

2. A method according to claim 1, including the step of providing in the portion of the guide rail between said edges a groove adapted to receive said foam plastic strip.

References Cited

UNITED STATES PATENTS

| 760,216 | 5/1904 | Laws _____ 285—424 X |
| 2,379,179 | 6/1945 | Petersen. |
| 2,491,700 | 12/1949 | Zwerling. |
| 2,916,054 | 12/1959 | Callan. |
| 2,974,078 | 3/1961 | Petritz. |
| 3,173,268 | 3/1965 | Sunshine _____ 285—424 X |
| 3,199,901 | 8/1965 | Jeppsson _____ 285—364 |

FOREIGN PATENTS 243,931    5/1960   Australia.

CHARLIE T. MOON, *Primary Examiner.*

U.S. Cl. X.R.

29—458, 235; 52—309; 277—1; 285—424; 287—189.36